US009158047B2

United States Patent
Hui et al.

(10) Patent No.: US 9,158,047 B2
(45) Date of Patent: Oct. 13, 2015

(54) METHOD FOR MANUFACTURING COLOR FILTER SUBSTRATE, COLOR FILTER SUBSTRATE AND TRANSFLECTIVE LIQUID CRYSTAL DISPLAY DEVICE

(71) Applicant: BOE TECHNOLOGY GROUP CO., LTD., Beijing (CN)

(72) Inventors: Guanbao Hui, Beijing (CN); Feng Zhang, Beijing (CN); Seungjin Choi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 112 days.

(21) Appl. No.: 14/125,545

(22) PCT Filed: Nov. 30, 2012

(86) PCT No.: PCT/CN2012/085700
§ 371 (c)(1),
(2) Date: Dec. 11, 2013

(87) PCT Pub. No.: WO2014/015605
PCT Pub. Date: Jan. 30, 2014

(65) Prior Publication Data
US 2015/0185379 A1    Jul. 2, 2015

(30) Foreign Application Priority Data

Jul. 27, 2012 (CN) .......................... 2012 1 0265595

(51) Int. Cl.
*G02F 1/1335* (2006.01)
*G02F 1/1333* (2006.01)
*G02B 5/20* (2006.01)

(52) U.S. Cl.
CPC .......... *G02B 5/201* (2013.01); *G02F 1/133512* (2013.01); *G02F 1/133514* (2013.01); *G02F 1/133516* (2013.01)

(58) Field of Classification Search
CPC ................... G02F 1/133514; G02F 1/133512; G02F 1/133516; G02F 1/133555; G02F 1/133371; G02F 1/136209; G02F 1/136227; G02F 2001/133388; G02B 5/201
USPC .......................................... 349/106, 114, 110
See application file for complete search history.

(56) References Cited

U.S. PATENT DOCUMENTS

2004/0196421 A1* 10/2004 Hwang .......................... 349/114
2004/0233359 A1* 11/2004 Nam et al. .................... 349/114
2004/0239841 A1* 12/2004 Inada et al. ................... 349/108
2007/0224524 A1 9/2007 Yan

FOREIGN PATENT DOCUMENTS

CN    1492265 A     4/2004
CN    101738778 A   6/2010
(Continued)

OTHER PUBLICATIONS

English translation of Chinese Patent No. 1492265, 21pgs.
(Continued)

*Primary Examiner* — Mike Qi
(74) *Attorney, Agent, or Firm* — Ladas & Parry LLP

(57) ABSTRACT

A method for manufacturing a color filter substrate, comprising: preparing a mask plate for black matrix, and providing light hole filling patterns (16), correspondingly for sub-pixels of specific colors, on the mask plate for black matrix; preparing a mask plate (18) for color filter, and providing light through holes (17) of the same size, for sub-pixels of different colors, on the prepared mask plate for color filter, a position of a light through hole (17) corresponding to a position of a light hole filling pattern (16); manufacturing a color filter substrate by using the mask plate for black matrix and the mask plate for color filter.

7 Claims, 3 Drawing Sheets

(56) References Cited

FOREIGN PATENT DOCUMENTS

| CN | 102778781 A | 11/2012 |
|----|-------------|---------|
| JP | 2005-148216 | 6/2005  |
| JP | 2009-251581 | 10/2009 |
| JP | 2010-271462 | 12/2010 |

OTHER PUBLICATIONS

English translation of Chinese Patent No. 101738778, 17pgs.
English translation of Chinese Patent No. 102778781, 16pgs.
First Office Action issued by the Chinese Patent Office for Chinese Patent Application No. 20121026559.4 dated May 6, 2014, 4pgs.
English translation of First Office Action issued by the Chinese Patent Office for Chinese Patent Application No. 20121026559.4 dated May 6, 2014, 2pgs.
International Search Report for International Application No. PCT/CN2012/085700, 12pgs, Apr. 18, 2013.
International Preliminary Report on Patentability for International Application No. PCT/CN2012/085700 dated Jan. 27, 2015, eight (8) pages.

\* cited by examiner

METHOD FOR MANUFACTURING COLOR FILTER SUBSTRATE, COLOR FILTER SUBSTRATE AND TRANSFLECTIVE LIQUID CRYSTAL DISPLAY DEVICE

CROSS REFERENCE TO RELATED APPLICATIONS

This application is based on International Application No. PCT/CN2012/085700 filed on Nov. 30, 2012, which claims priority to Chinese National Application No. 201210265595.4 filed on Jul. 27, 2012, the contents of which are incorporated herein by reference.

TECHNICAL FIELD

The embodiments of the present invention relate to a method for manufacturing a color filter substrate, a color filter substrate, and a transflective liquid crystal display device.

BACKGROUND

In the recent years, the liquid crystal displays (for example, TFT-LCD) are more and more widely applied in the outdoor portable products, such as mobile phones, PDA, tablet computer. Ordinary liquid crystal displays however, when used outdoor in the daylight, have poor contrast, causing poor readability for the screens. Whereas the transflective liquid crystal display can, by improving the reflection ratio of the panel, increase the contrast of the display device when displaying outdoor, and accordingly good readability can also be obtained when the display is used outdoor.

A pixel of a transflective liquid crystal display has a transmissive part and a reflective part, and the configuration thereof is illustrated in FIG. 1. In order to improve optical reflection efficiency, it's generally to prepare light through hole in the color filter portion corresponding to the reflecting region. In prior art, as illustrated in FIG. 2, light through holes 14 are always provided in the red, green, blue color filters, in such a way that when the reflected light 19 is emitted from each of the light through holes 14, the reflected light 19 pass through the color filter only once (as illustrated in FIG. 1). If the light through hole for each sub-pixel is set to be identical in size, the processes for preparing the red, green, blue color filters can use a same mask plate, and of course such processes are simple, but the chrominance for the presented white light will shift toward the blue color, thus causing color deviation for the display.

In order to prevent the display from suffering color deviation, it's possible to regulate the ratio among the red, green, blue light components in the emergent light by regulating the sizes of the light through holes on the mask plates for the red, green, blue color filters. In general, the sizes of the light through holes on the mask plates for the red, green, blue color filters are set to be different from each other, which can ensure the display effect of the display and avoid color deviation. However, in such a case, setting the light through holes of different size for the red, green, blue sub-pixels requires three mask plates, that is, the red, green, blue mask plates, and therefore the manufacturing costs for the color filter substrate are increased.

SUMMARY

The embodiment of the present invention provides a method for manufacturing the color filter substrate, a color filter substrate as well as a transflective liquid crystal display device, used for reducing manufacturing costs of the color filter substrate while ensuring no color deviation occurs when the display device is displaying.

A method for manufacturing a color filter substrate according to an embodiment of the present invention comprises the following steps of:

preparing a mask plate for black matrix, and providing light hole filling patterns, correspondingly for sub-pixels of specific colors, on the mask plate for black matrix;

preparing a mask plate for color filter, and providing light through holes of a same size, for sub-pixels of different colors, on the prepared mask plate for color filter, positions of light through holes corresponding to positions of the light hole filling patterns; and manufacturing the color filter substrate by using the mask plate for black matrix and the mask plate for color filter.

In an embodiment of the present invention, the method further comprises forming an organic planarization layer on the surface of a color filter layer after the step of manufacturing the color filter substrate by using the mask plate for black matrix and the mask plate for color filter.

In an embodiment of the present invention, areas of effective light through holes for the red sub-pixel color filter, effective light through holes for the green sub-pixel color filter and effective light through holes for the blue sub-pixel color filter in the color filter substrate have a ratio range of 1:0.9:0.8 to 1:6:2.

In an embodiment of the present invention, the areas of the effective light through holes for the red sub-pixel color filter, the effective light through holes for the green sub-pixel color filter and the effective light through holes for the blue sub-pixel color filter in the color filter substrate have a ratio of 1:2:0.5.

In an embodiment of the present invention, the step S1 of preparing the mask plate for black matrix and the step of preparing the mask plate for color filter is conducted interchangeably in sequence.

An embodiment of the present invention further provides a color filter substrate manufactured by the method for manufacturing the color filter substrate, comprising a color filter layer and a black matrix layer, and the light through holes for sub-pixel color filters of specific colors are shielded by the corresponding light hole filling patterns of a black matrix.

Further, an embodiment of the present invention also provides a transflective liquid crystal display device which comprises a display panel comprising the above color filter substrate and a thin film transistor array substrate.

BRIEF DESCRIPTION OF THE DRAWINGS

In order to illustrate the technical solution of the embodiment of the present invention more clearly, a simply introduction about the drawings of the embodiments will be made in the following, and obviously, the drawings described later relate to only some embodiments of the present invention, rather than limitation to the present invention.

REFERENCE NUMBERS

1—upper glass substrate; 2—color filter layer; 3—organic planarization layer; 4—organic layer; 5—insulating layer; 6—lower glass substrate; 7—gate metallic layer; 8—pixel electrode layer; 9—metal reflecting layer; 10—black matrix layer; 11—transmissive region of organic color filter layer; 12—reflective region of organic color filter layer; 13—strip pattern region of black matrix; 14—light through hole; 15—strip pattern; 16—light hole filling pattern; 15'—strip pattern of black matrix; 16'—light hole filling pattern of black matrix; 17—light through hole in mask plate for color filter; 18—mask plate for color filter; 19—reflected light; 20—transmitted light.

DETAILED DESCRIPTION

To make clearer the object, technical solutions and advantages of the embodiments of the present invention, a clear and full description of the technical solution of the embodiment of the present invention will be made with reference to the accompanying drawings of the embodiment of the present invention. Obviously, the described embodiments are merely part of the embodiments of the present invention, but not all the embodiments. Based on the described embodiments of the present invention, all the other embodiments acquired by the ordinary skilled in this art, without any creative labor, fall into the protective scope of the present invention.

Embodiment 1

The effective light through holes of the color filter substrate, made by the method for manufacturing a color filter substrate of the embodiment of the present invention, formed by the overlay between the light through holes of the color filter layer prepared with a mask plate for the color filter substrate and the light hole filling patterns in the black matrix of the black matrix layer. The manufacturing processes may be performed in the order of first forming a black matrix (BM) layer and then forming red (R), green (G), blue (B) color filter layers.

A method for manufacturing the color filter substrate according to the embodiment of the present invention comprises the following steps.

S1, preparing a mask plate for black matrix, and providing light hole filling patterns, correspondingly for sub-pixels of specific colors, on the mask plate for black matrix.

The black matrix layer may be formed with the mask plate for black matrix.

Figure 4:
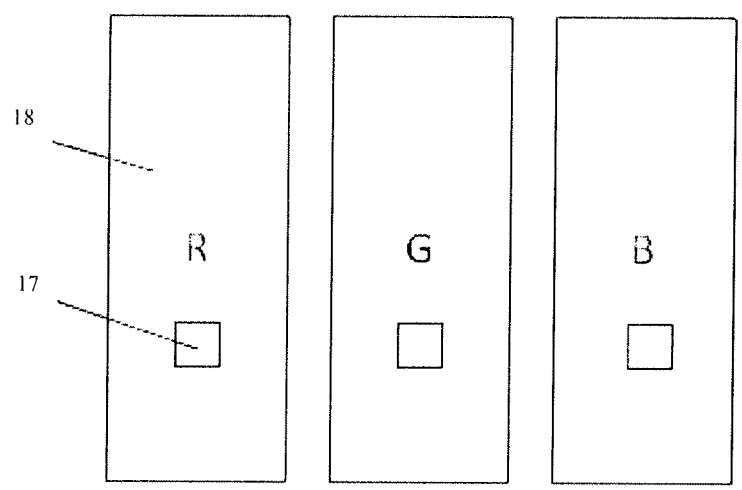
FIG. 4 is a schematic view showing the mask plate for the color filter of an embodiment of the present invention.

S2, preparing a mask plate for color filter, and providing light through holes 17 of a same size for sub-pixels of different colors on the prepared mask plate for color filter, as illustrated in FIG. 4.

A color filter layer may be formed through the mask plate for color filter.

Light through holes 17 of the same size on the mask plate for color filter is made for sub-pixels of different colors, thus the processes for preparing the red, green, blue color filters may use a same mask plate for color filters.

S3, manufacturing the color filter substrate by using the mask plate for black matrix and the mask plate for color filter.

Specific processes for preparing a black matrix layer with the mask plate for black matrix, preparing a color filter layer with the mask plate for color filter, and preparing other layers of the color filter substrate can be conducted according to existing processes, thereby creating a color filter substrate.

The order of the above steps S1, S2 is interchangeable.

Figure 3:
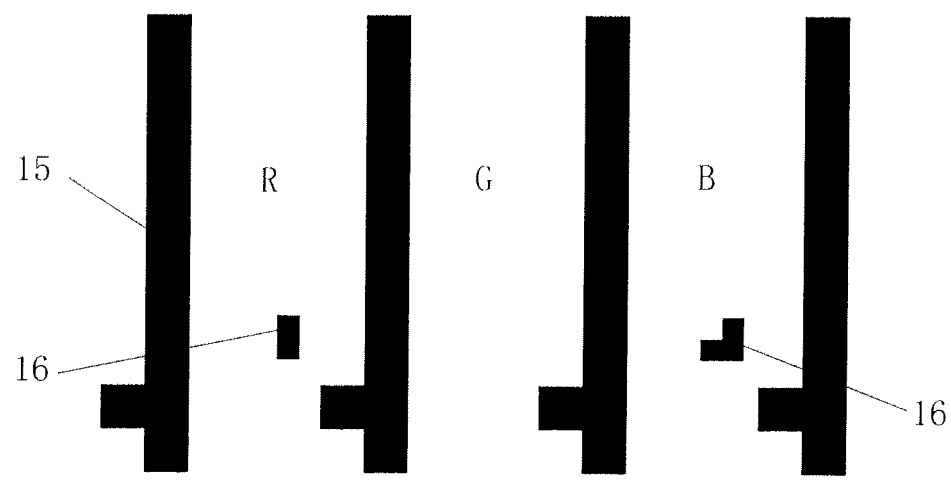
FIG. 3 is a schematic view showing the mask plate for the black matrix of an embodiment of the present invention.

As illustrated in FIG. 3, there shows the mask plate for black matrix for three sub-pixels (while in an existing mask plates for black matrix, only strip pattern 15 is provided and there are no light hole filling patterns 16). By providing strip patterns 15 and different light hole filling patterns 16, on the mask plate for black matrix, for the red, green, blue sub-pixels, at the same time by preparing light through holes 17 of the same size, on the mask plate for color filter, for the sub-pixels of different colors, and further making the positions of the light through holes 17 on the mask plate for color filter correspond to the positions of the light hole filling patterns 16, it's possible to form sub-pixel color filters for three colors, i.e., the red, green, blue with one mask plate for color filter.

In order to prevent the color filter substrate prepared by using the method according to the embodiment of the present invention from suffering color deviation when being applied to a display device, the method of the embodiment of the present invention may set the areas of the effective light through hole of red sub-pixel color filter, the effective light through hole of green sub-pixel color filter, and the effective light through hole of blue sub-pixel color filter to be in a ratio range of 1:0.9:0.8 to 1:6:2.

Specifically, the method of the embodiment of the present invention may, by regulating the sizes of corresponding light hole filling patterns on the mask plate for black matrix respectively, prepare effective light through holes of different sizes in the sub-pixel color filters of the color filter substrate, this is, the areas of the effective light through hole of red sub-pixel color filter, the effective light through hole of the green sub-pixel color filter, and the effective light through hole of the blue sub-pixel color filter are in a ratio range of 1:0.9:0.8 to 1:6:2.

By setting the ratio of actual sizes of the light through holes for the red, green, blue sub-pixel color filters to be: red:green:blue=1:2:0.5, it can be ensured that the color coordinate of the white light presented by the display panel is kept at (0.33, 0.33), and thereby the display effect when this color filter substrate is applied to a display device can be ensured with no color deviation occurring.

In order to ensure the color coordinate (0.33, 0.33) for the white light presented by the display panel, the area among the effective light through hole for red sub-pixel color filter, the effective light through hole for green sub-pixel color filter and the effective light through hole for blue sub-pixel color filter of the color filter substrate may be, for example, in the ratio of 1:2:0.5.

Figure 5:
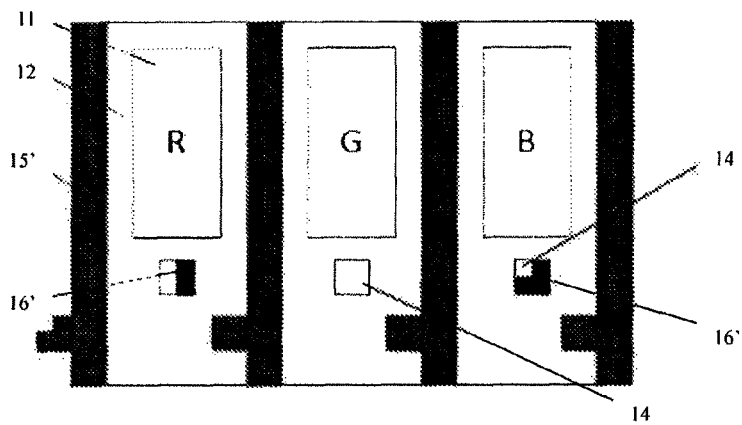
FIG. 5 is a structural representation of the transflective color filter substrate prepared by using the method of an embodiment of the present invention.

A specific arrangement may be as follows: for the red sub-pixel, the prepared mask plate for black matrix is provided with a light hole filling pattern occupying a half of the area of the light through hole on the mask plate for color filter; for the green sub-pixel, the prepared mask plate for black matrix has no light hole filling pattern provided thereon; for the blue sub-pixel, the prepared mask plate for black matrix is provided with a light hole filling pattern occupying ¾ of the area of the light through hole on the mask plate for color filter. Therefore, the light through holes 14 of the color filters are shielded by the corresponding light hole filling patterns 16' of the black matrix, so that the actual light through holes have the above area ratio 1:2:0.5, as illustrated in FIG. 5.

In order to protect the color filter layer and prevent liquid crystal from being contaminated by the color filter layer, the method of the embodiment of the present invention may further comprise the step of preparing an organic planarization layer on the surface of the color filter layer after the step S3.

The organic planarization layer formed with the method of the embodiment of the present invention may also achieve the effect of flatness in addition to protecting of the color filter layer.

With the method for manufacturing the color filter substrate according to the embodiment of the present invention, the mask plate for black matrix is provided with specific light hole filling patterns 16 made for the sub-pixels of specific colors, and the mask plate for color filter for the sub-pixels of different colors is prepared with light through holes 17 of the same size, and the positions of the light through holes 17 on the mask plate for color filter corresponds to the positions of the light hole filling patterns 16, and then a color filter substrate is formed with the mask plate for black matrix and the mask plate for color filter. When forming the black matrix layer, because the light hole filling patterns 16 correspond to the light hole filling patterns 16' in the black matrix, and can partially cover the light through holes 17 on the mask plate for color filter respectively, its possible for one mask plate for color filter to be used for preparing the red, green, blue sub-pixel color filters having effective light through holes 14 of different sizes, thereby ensuring that, when the color filter substrate prepared by using the method of the embodiment of the present invention is applied to the display device, no color deviation occurs and the manufacturing costs for the color filter substrate can be further reduced.

Embodiment 2

The embodiment of the present invention also provides a color filter substrate, which in particular can be prepared by using the method of the first embodiment.

The color filter substrate of the embodiment of the present invention comprises a color filter layer and a black matrix layer, wherein the light through holes 14 of the sub-pixel color filters are provided with corresponding light hole filling patterns 16' in black matrix.

For the convenience of understanding by the skilled person in the related art, in the following, a detailed description about the configuration of the color filter substrate of the embodiment of the present invention will be made with reference to FIG. 6.

The color filter substrate of the embodiment of the present invention may be applied to a transflective liquid crystal display device.

The color filter substrate (also referred to as an upper substrate) in particular may comprise an upper glass substrate 1, a black matrix layer below the upper glass substrate 1, and a color filter layer 2 below the black matrix layer. Particularly, the color filter layer 2 comprises red, green, blue color filters, and the red, green, blue color filters comprise light through holes 14 of a same size, which can be formed with one mask plate 18 for color filter having light through holes 17 as illustrated in FIG. 4.

The upper substrate may further comprise an organic planarization layer 3 below the color filter layer 2 for protecting the color filter layer and preventing the color filter layer from contaminating liquid crystal, and further for the purpose of flatness.

Figure 1:
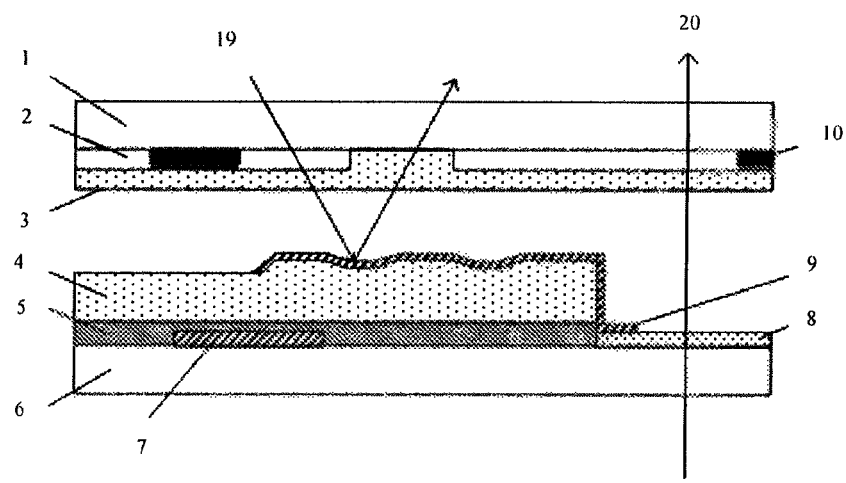
FIG. 1 is a schematic view showing the configuration as well as the light path therein of an existing transflective liquid crystal display.
Figure 2:
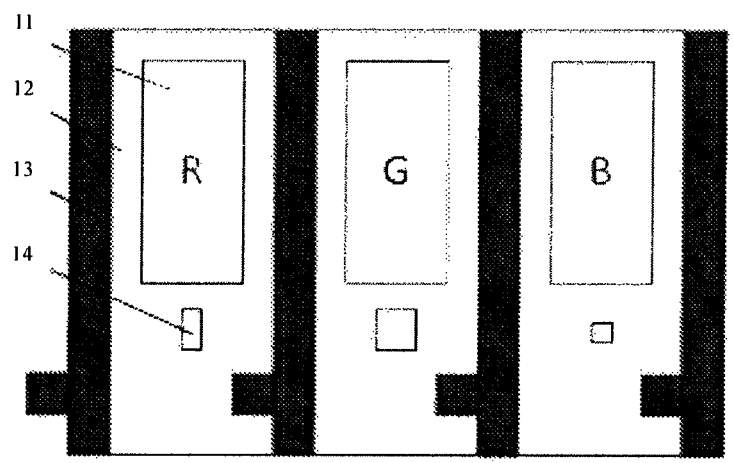
FIG. 2 is a structural representation of the color filter substrate of the existing transflective liquid crystal display.

The black matrix layer may comprise strip patterns 15' of the black matrix (i.e., the patterns of the black matrix layer 10 in prior art illustrated in FIG. 1) and the light hole filling patterns 16' of the black matrix.

In order to prevent color deviation for occurring in display by a transflective liquid crystal display device, the embodiment of the present invention regulates the ratio of red, green, blue light components in the emergent light by regulating the sizes of the effective light through holes of the red, green, blue color filters. The areas of the effective light through holes for the red sub-pixel color filter, the effective light through holes for the green sub-pixel color filter and the effective light through holes for the blue sub-pixel color filter in the color filter substrate may have a ratio in the range of 1:0.9:0.8 to 1:6:2.

In order to achieve an area ratio in the range of 1:0.9:0.8 to 1:6:2 for the effective light through holes for the red sub-pixel color filter, the effective light through holes for the green sub-pixel color filter and the effective light through holes for the blue sub-pixel color filter in the color filter substrate, the sizes of the specific light hole filling patterns 16 on the mask plate for black matrix may be adjusted respectively to achieve this object.

Because the ratio of the actual sizes of the light through holes for the red, green, blue sub-pixel color filters is set to be: red:green:blue=1:2:0.5, it can be ensured that the light coordinate of the white color presented by the display panel is kept at (0.33, 0.33), and thereby the display effect can be ensured when this color filter substrate is applied to the display device with no color deviation occurring.

In order to maintain the light coordinate for the white color presented on the display panel to be (0.33, 0.33), the area ratio of the effective light through holes on the red, green, blue sub-pixel color filters may be 1:2:0.5. Since the light through holes 14 for the red, green, blue color filter layers in the color filter layer 2 have a same size, the black matrix layer may be provided with the light hole filling patterns 16' of special sizes in the black matrix at the positions of the light through holes 14 so as to achieve the above area ratio of 1:2:0.5.

Therefore, the specific arrangement may be as follows: for the red sub-pixel, the prepared mask plate for black matrix may be provided with a light hole filling pattern occupying a half of the area of the light through hole on the mask plate for color filter; for the green sub-pixel, the prepared mask plate for black matrix may be provide with no light hole filling pattern provided thereon; for the blue sub-pixel, the prepared mask plate for black matrix may be provided with a light hole filling pattern occupying ¾ of the area of the light through hole on the mask plate for color filter. Thus, the light through holes of the color filter will be shielded by the corresponding light hole filling patterns 16' in black matrix, so that the remaining effective light-transmissive parts have the above area ratio 1:2:0.5, as illustrated in FIG. 5.

The color filter substrate of the embodiment of the present invention may be particularly any one of the color filter substrates made by using the method of the embodiment of the present invention.

Embodiment 3

The embodiment of the present invention also provides a transflective liquid crystal display device, comprising the color filter substrate of the second embodiment. The transflective liquid crystal display device according to the embodiment of the present invention may be specifically display devices, such as TV, computer monitor, mobile phone and the like.

For the convenience of understanding by the skilled person in the related art, in the following, a detailed description about the configuration of the transflective liquid crystal display device of the embodiment of the present invention will be made with reference to FIG. 6.

The transflective liquid crystal display device of the embodiment of the present invention may comprise a display panel, and the display panel comprises an upper substrate (also called a color filter substrate) and a lower substrate (also called a TFT array substrate).

The lower substrate specifically may comprise a lower glass substrate 6, a gate metallic layer 7 on the lower glass substrate 6, an insulating layer 5 on the gate metallic layer 7, an organic layer 4 on the insulating layer 5, a metal reflecting layer 9 on the organic layer 4, a source-drain metallic layer (not illustrated in the drawing) on the organic layer 4, and a pixel electrode layer 8 connected with the metal emission layer 9 and the source-drain metallic layer.

In particular, the upper substrate (color filter substrate) may comprise an upper glass substrate 1, a black matrix layer 20 below the upper glass substrate 1, and a color filter layer 2 below the black matrix layer.

The color filter layer 2 particularly comprises red, green, blue color filters, and the red, green, blue color filters comprise light through holes 14 of a same size. For example, one mask plate 18 for color filter having light through holes 17 on the mask plate for color filter, as illustrated in FIG. 4, can be used for preparing the red, green, blue color filters.

Below the color filter layer 2, the upper substrate may further comprise an organic planarization layer 3 below the color filter layer 2 for protecting the color filter layer and preventing the color filter layer from contaminating liquid crystal, and further for the purpose of flatness.

The black matrix layer may comprise strip patterns 15' of the black matrix (i.e., the specific patterns of the black matrix layer 10 in prior art illustrated in FIG. 1) and the light hole filling patterns 16' of the black matrix.

In order to prevent color deviation occurring in display by a transflective liquid crystal display device, the ratio of the red, green, blue light components in the emergent light may be regulated by regulating the sizes of the effective light through holes of the red, green, blue color filters. The areas of the effective light through holes for the red sub-pixel color filter, the effective light through holes for the green sub-pixel color filter and the effective light through holes for the blue sub-pixel color filter in the color filter substrate may have a ratio in the range of 1:0.9:0.8 to 1:6:2.

In order to achieve have an area ratio in the range of 1:0.9:0.8 to 1:6:2 for the effective light through holes for the red sub-pixel color filter, the effective light through holes for the green sub-pixel color filter and the effective light through holes for the blue sub-pixel color filter in the color filter substrate, the sizes of the specific light hole filling patterns 16 on the mask plate for black matrix may be regulated respectively to achieve this object.

Because the area ratio of the actual sizes of the light through holes for the red, green, blue sub-pixel color filters is set to be: red:green:blue=1:2:0.5, it is possible to ensure that the light coordinate of the white color presented by the display panel is kept at (0.33, 0.33), and thereby the display effect when this color filter substrate is applied to the display device can be ensured.

In a further arrangement, because the light through holes 14 of the red, green, blue color filters in the color filter layer 2 have the same size, the area ratio among the light through holes of the red, green, blue sub-pixels may be 1:2:0.5 so as to ensure that the light coordinate of the white color presented on the display panel is kept at (0.33, 0.33). For the red sub-pixel, therefore, the prepared mask plate for black matrix is provided with a light hole filling pattern occupying a half of the area of the light through hole on the mask plate for color filter; for the green sub-pixel, the prepared mask plate for black matrix may be provide with no light hole filling pattern provided thereon; for the blue sub-pixel, the prepared mask plate for black matrix may be provided with a light hole filling pattern occupying ¾ of the area of the light through hole on the mask plate for color filter. Therefore, the light through holes of the color filter will be shielded by the corresponding light hole filling patterns, so that the rest effective light-transmissive parts have the above area ratio 1:2:0.5, as illustrated in FIG. 5.

Figure 6:
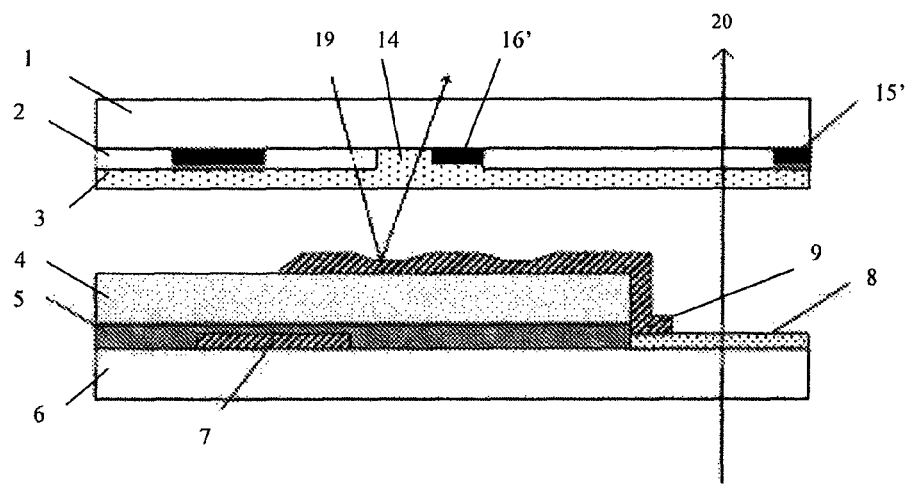
FIG. 6 is a schematic view showing the light path in the transflective liquid crystal display device made by using the method of an embodiment of the present invention.

FIG. 6 is a schematic view showing the light path of the display device. Compared with the existing display device as illustrated in FIG. 1, the light through holes 14 of the color filter layer as illustrated in FIG. 6 are partially shielded by the light hole filling patterns 16' in the black matrix.

The above described are solely exemplary embodiments of the present invention, rather than limitation on the protective scope of the present invention which is defined by the accompanying claims.

The invention claimed is:

1. A method for manufacturing a color filter substrate, comprising the steps of:
   preparing a mask plate for black matrix, and providing light hole filling patterns, correspondingly for sub-pixels of specific colors, on the mask plate for black matrix;
   preparing a mask plate for color filter, and providing light through holes of a same size, for sub-pixels of different colors, on the prepared mask plate for color filter, positions of light through holes corresponding to positions of the light hole filling patterns; and
   manufacturing the color filter substrate by using the mask plate for black matrix and the mask plate for color filter.

2. The method according to claim 1, wherein the method further comprises forming an organic planarization layer on the surface of a color filter layer after the step of manufacturing the color filter substrate by using the mask plate for black matrix and the mask plate for color filter.

3. The method according to claim 1, wherein areas of effective light through holes for the red sub-pixel color filters, effective light through holes for the green sub-pixel color filters, and effective light through holes for the blue sub-pixel color filters in the color filter substrate have a ratio range of 1:0.9:0.8 to 1:6:2.

4. The method according to claim 3, wherein the areas of the effective light through holes for the red sub-pixel color filter, the effective light through holes for the green sub-pixel color filter, and the effective light through holes for the blue sub-pixel color filter in the color filter substrate have a ratio of 1:2:0.5.

5. The method according to claim 1, wherein the step of preparing the mask plate for black matrix and the step of preparing the mask plate for color filter are conducted interchangeably in sequence.

6. A color filter substrate prepared by using the method according to claim 1, comprising a color filter layer and a black matrix layer, wherein the light through holes for sub-pixel color filters of a specific color are shielded by the corresponding light hole filling patterns for black matrix.

7. A transflective liquid crystal display device, wherein the display device comprises a display panel, which comprises a thin film transistor array substrate and the color filter substrate according to claim 6.

* * * * *